Oct. 21, 1947.   H. C. GIBSON, SR   2,429,353
CONFECTION
Filed May 10, 1946

Inventor
H. C. GIBSON

Attorneys

Patented Oct. 21, 1947

2,429,353

UNITED STATES PATENT OFFICE 2,429,353

CONFECTION

Harvey C. Gibson, Sr., Lancaster, Pa.

Application May 10, 1946, Serial No. 668,673

9 Claims. (Cl. 99—137)

This invention relates to a confection and is a continuation in part of the application Ser. No. 544,906, filed by me under date of July 14, 1944.

An object of the invention is the provision of a confection carried by a wafer which is mounted on a stick having a slot therein to receive and support said wafer, to both sides of which is applied a confection of different kinds or flavors, the confection being frozen if desired with a housing applied to the outer surface, the wafer seated within the slot in the stick for maintaining it in accurate position within a housing and out of contact therewith.

Another object of the invention is the provision of a confection mounted on a conjoined wafer and stick with the confection applied to both faces and edges thereof, said wafer seated within a notch in said stick with shoulders provided thereon cooperating to maintain said wafer in a predetermined position, with the confection sealed to the wafer and stick, the confection comprising a part or all of the edible materials being fresh, frozen or canned fruit, the fruit being finely divided to provide a more perfect blending therewith a stabilizer for improving the texture of the fruit and for preventing the formations of hard ice crystals therein with the mass fixed to one or both sides of the wafer.

A further object of the invention is the provision of a confection carried by a wafer joined to a stick locating and supporting said wafer in accurate position which is embedded in the confection, said wafer with ribs provided thereon received within a slot in said stick for interlocking with the bifurcations provided on said stick so the wafer will be securely held in place on the stick. Housings comprising coatings or preformed moisture-proof edible containers or non-edible containers may be applied to the outer surface of the confection with the whole being enclosed within a non-edible wrapper.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

Figure 1:
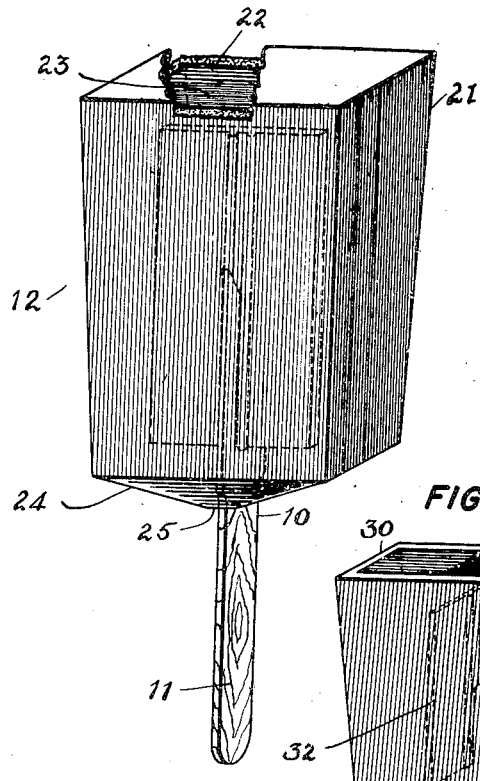
Figure 1 is a view in perspective showing a confection constructed according to the principles of my invention.

Referring more particularly to the drawing 10 designates generally the stick having a portion 11 projecting outwardly from an edible mass generally designated by the numeral 12.

Figure 2:
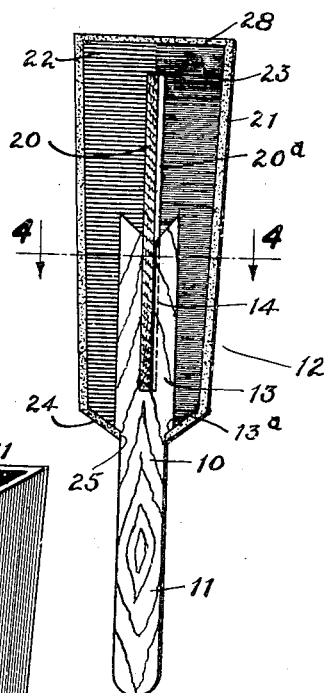
Figure 2 is a transverse vertical section adjacent the center of the confection showing the position of the stick supporting a wafer in the slot.

The inner end 13 of the stick is bifurcated to provide an elongated notch 14 which is embedded in the confection. The bifurcated inner end of said stick is wider than the projecting portion to provide shoulders 13a thereon so that when the portion 11 of the stick is received by the passage 25 at the bottom of the housing, as illustrated in Fig. 2, said shoulders become engaged with the bottom of said housing. The purpose of this arrangement is to locate and support a wafer 20 seated in the slot 14 of the stick 10 in accurate, predetermined position away from the bottom of the housing, providing a space sufficient to permit a portion of the materials disposed in the compartments therein to flow between the end of the wafer and the bottom of the housing. This stick may be made any shape and the handle may be round or flat.

Figure 4:
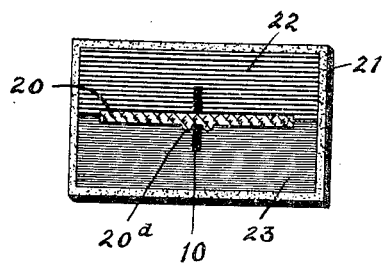
Figure 4 is a horizontal section taken along the line 4x—4x of Fig. 2.
Figure 5:
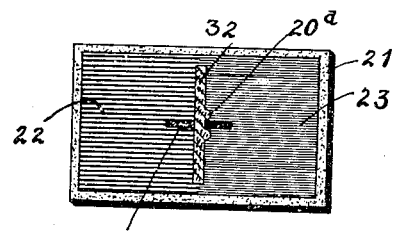
Figure 5 is a sectional view similar to Fig. 4 showing the wafer and stick as arranged in Fig. 3.

The wafer 20 is of sufficient area that it substantially divides the mass of confection 12 into two separate parts yet being of less area than the mass of confection the latter extends around its edges as illustrated in Figs. 2, 4 and 5 to protect said wafer against deterioration by defrosting when removed from refrigeration.

The wafer partition may comprise any suitable edible materials, and it may be flavored to conform to the flavorings of the confection enclosing it.

Cake dough or batter treated to provide a light, crisp consistency is especially adaptable for use.

The wafer 30 has two ribs or ridges 20a provided thereon spaced for permitting the bifurcations of the supporting stick to be passed and fit snugly between them. Thus with the wafer also seated between said bifurcations of the stick the interlocking of said ribs and bifurcations prevents possible lateral movement of the wafer within the slot of the stick.

The ribs may be supplied either unilaterally or bilaterally to the wafer. Furthermore, the ribs provide substantial reinforcement for the wafer and for this cause additional ribs or figurations may be supplied, if desired.

However, the right to employ a wafer not provided with ribs is reserved.

The basic idea of employing a wafer in this confection is not alone to provide an article of food but primarily to use it as an important structural feature providing a partition for substantially separating two types or flavors of confection which is sealed to the faces and edges thereof and also to provide two compartments within a housing or a mold. It is smaller than the areas between the walls of said housing and it is mounted on a stick so as to accurately support its edges out of contact with the bottom and walls of said housing. The particular reason for this is to permit the materials filled into the compartments to unite around the edges of the wafer as illustrated in Figs. 2, 4 and 5.

These wafers when made of cake dough or batter are crisp and spongy and they readily absorb moisture. This quickly becomes frozen when the confection is subjected to refrigeration to complete it. Conversely when removed from refrigeration the wafer soon becomes defrosted, soggy and unpalatable unless the edges are protected against defrosting by the surrounding masses. By thus retaining the frozen moisture in the wafer it retains its crispness and remains in a crunchy condition as long as the confection remains frozen thereto.

While the above is directed to the matter of protecting the edges of the wafer it is also apparent that by supporting it on the stick it is accurately located and held thereby in the housing and the freezing of the materials in the compartments causes them to become adhered to its opposite faces or surfaces, thus protecting them against defrosting and likewise they adhere to the stick and bind the wafer thereto as indicated in Figs. 4 and 5. Consequently a frozen mass firmly engages both the wafer and the stick until it is entirely consumed by the eater.

An important feature of the combination wafer and stick is that the wafer supported in the notch of the stick will support the confection on the stick and prevent it from slipping downwardly on to the hands of the consumer.

The housing for the confection, as designated by the numeral 21 in Fig. 1, is provided by applying a coating over the exterior of the masses of confection as generally designated by the numerals 22 and 23 which have been sealed to the faces and edges of the wafer-partition as designated by the numeral 12 enclosing the masses of confection, and the top is closed as illustrated by the numeral 28 in Fig. 2.

Figure 3:
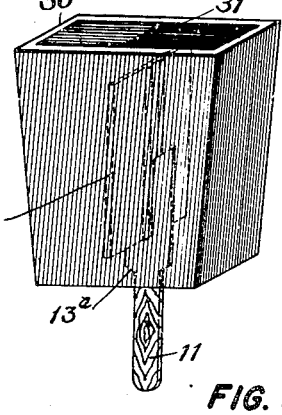
Figure 3 is a modified form of the confection showing the stick and wafer at right angles to the position disclosed in Fig. 1.

When a preformed edible or a non-edible container is employed for a housing, as designated by the numeral 30 in Fig. 3 the top of said housing is open as indicated by the numeral 31. However, after the compartments in the housing have been filled a covering for the top may be provided by means of a coating or an icing. Said container is provided with a passage at the bottom to receive the handle portion of the stick as indicated at 25.

If desired the wafer partition may be a narrow one and located, as indicated at 32 in Figs. 3 and 5 at right angles to the position of the partition as designated in Figs. 1, 2 and 4. According to this arrangement it is apparent that the relationship of the materials as disposed in the compartments of the housings differ, so that in the eating thereof the confection, as illustrated in Figs. 1, 2 and 4 provides two types or flavors with each bite taken of the confection. Alternatively whereas, only one type or flavor is had with each bite of the confection as illustrated in Figs. 3 and 5.

The edible container may be made of any suitable material, as an example: It may be made of the materials employed in the manufacture of ice cream cones. And it may be made moisture proof by coating or lining its interior surfaces with any approved edible, moisture resisting material. For accomplishing this end and facilitating speed and economy, a number of molds such as may conveniently be handled are firmly bound together and a like number of containers seated therein to receive said coating or lining material. A corresponding number of plugs accurately conforming to the interior surfaces of said containers are also provided, said plugs having handles supplied thereto to facilitate convenience by inserting said handles into a mechanical device made especially for the purpose of holding and maintaining said plugs in accurate position with relation to the position of the containers in the molds, said plugs having their exterior surfaces supplied with said moisture-proofing ingredients, after which they are simultaneously inserted into said containers and quickly withdrawn therefrom. Thus the moisture proofing is completed.

The materials which are simultaneously filled into the housing compartments at each side of the wafer are widely varied and any combinations of materials may be employed to provide a higher degree of palatability through a more perfect blending of the materials employed as an example. Ice cream or water ice may be supplied in one compartment while crushed fruits which have been duly stabilized may be supplied to the other compartment. The materials may be frozen or they may be congealed sufficiently or held together in any approved manner.

And since higher quality and considerably larger quantities of stabilization is required for fruit than is required for ice cream the necessity for their separate processing and separate compartments within the housing when a combination thereof are employed in this confection becomes strikingly apparent.

Fruits and/or fruit juices are particularly desirable for use in this confection—they are, preferably, finely divided for more perfect blending with a stabilizer for fortifying them for resistance against formation of objectionable hard ice crystals therein when frozen; for providing a smooth, velvet-like texture, and improving palatability; for converting the juices into a semi-jelled consistency, eliminating sloppy liquids in handling—for which: gelatin, pectin, agar agar or other approved stabilizers are employed. The approximate required amount of the above named stabilizers—dry or powder form—high grade and full strength, is: Gelatin, 1% to 1½%; pectin, 1¼% to 2%; agar agar ¾ of 1% to 1¼%, varying according to the requirements of different fruits. Other materials are stabilized according to their respective requirements.

Fruit acids are employed for emphasizing flavor and for more perfect blending of flavors employed.

Since most stabilizers will keep perfectly for a long time after incorporation with the fruits it is expedient to process the fruits when canned or otherwise preserved, thus facilitating both progress and economy, plus a higher degree of sanitation in handling.

Lower grades of gelatin discolor fruits, therefore, it is necessary to employ the highest grade which is colorless, odorless and tasteless.

Pectin is a desirable stabilizer in this confection since it works well in acid media.

In making the confection a mold provided with a series of cavities to facilitate forming, freezing or otherwise congealing the masses of material is required, especially when the housing as designated by the numeral 21 in Fig. 1 comprises a coating which is applied over the exterior of the frozen confection after it is released from said molds. The molds may be provided with a passage conforming to the passage 25 in the preformed container to permit a portion of the stick to enter therethrough until the shoulders of the bifurcated end supporting a wafer are firmly engaged with the bottom of said mold.

On the other hand, the sticks having the wafers seated within the slots may be inverted and suspended within the molds by a mechanical stick-holding device. In this event the stick-holding device is inverted and the sticks are inserted into a passage provided in said stick-holder for receiving the ends of said sticks, the shoulders thereof engaging the surfaces immediately surrounding said passages, whereupon the sticks are clamped firmly in the passages and the holder supporting the sticks and wafers is reversed and accurately positioned over the molds, thus suspending said sticks and wafers in position within said molds. A support may be provided at the bottom of the mold upon which the bottom end of the wafer may rest in order to insure a space between the wafer and the bottom of the mold so as to permit the masses of materials filled into the compartments to unite around the bottom end of the wafer. The molds should be tapered sufficiently to facilitate the release of the confection. The coating may be accomplished while the confection is still retained by the stick-holder.

When preformed edible or non-edible containers are employed for housing the confection the use of molds is also desirable. Therefore, since the processing of the edible containers for moisture proofing requires a mold, as heretofore explained, it is expedient while the containers are already disposed in the molds to fill the housing compartments with the confection material after the stick supporting the wafer-partition in position has first been located therein.

After the compartments in the preformed containers are filled with confection material the tops thereof remain open and the ends of the confection are exposed as indicated by the numeral 31 in Fig. 3. However, a covering comprising coatings or icings may be employed for sealing the tops of both the edible or non-edible containers, as indicated by 28 in Fig. 2. Or a non-edible covering may be employed for the non-edible container.

In order that the coatings or icings may be more conveniently applied to the exposed tops of the confection the containers should be a little taller than the molds, permitting a slight portion of the top of the containers to be exposed. Thus after the confection is formed and frozen the molds containing said confection may be inverted and the exposed open ends thereof dipped into a coating or icing material. Or the covering may be accomplished in any other approved manner. On the other hand, edible coverings may be omitted and the confection enclosed within a suitable wrapper. It is desirable, due to the eye appeal provided by the variegated colors of the various materials employed, that the coatings and wrappers be of transparent materials.

Any other approved manner for making the confection may be employed as may become convenient from time to time.

While the confection is shown in the accompanying drawings as substantially rectangular it may be made of any shape desired. And the bottom 24 of the containers and molds may be substantially tapered to facilitate guiding the handle of the stick into the passage 25 therein.

A considerable part of the foregoing specification is devoted to ways and means for making the confection which may be enclosed in different types of housings.

The invention is predicated on the salient structural features of a wafer of less area than the interior of a housing located and supported in accurate, predetermined position within said housing and out of contact with the walls and bottom thereof by a slotted stick having shoulders provided thereon. The wafer seated within the elongated slot in the stick is firmly held in accurate position away from the walls of the housing. The ribs which may be provided on the wafer prevent possible lateral movement of the same by becoming interlocked with the bifurcations of the stick, as illustrated in the accompanying drawings. The shoulders are properly spaced below the bottom of the slot supporting the wafer and are engaged within the bottom of the housing, thus locating and supporting the wafer at a predetermined space from the bottom of the housing to permit a portion of the edible material disposed in the compartments therein to flow and unite around the bottom of the wafer. The wafer provides a partition for substantially separating the housing into two compartments, separating two kinds or flavors of edible material which may require different qualities, quantities or kinds of stabilizing ingredients for producing a perfect result.

The edible material which is disposed, simultaneously, into the housing compartments congeals or freezes, adhering to the faces and extending past and around the edges of the wafer, protecting it against deterioration by defrosting when removed from refrigeration, the confection being firmly supported by the conjoined wafer and stick.

What I claim and desire to secure by Letters Patent is:

1. A confection comprising a housing having its interior lined with a moisture-resisting edible material, an edible partition forming compartments therein and of less width and height than the housing, a stick supporting said partition with its edges out of engagement with said housing and congealed masses of edible material in said housing compartments extending around the edges of the partition.

2. A confection comprising a housing, said housing being open at the top, an edible partition forming compartments therein of less width and height than the housing, a stick supporting said partition with its edges out of engagement with said housing, frozen masses of edible material in said housing compartments extending around the edges of the partition, and a closure for the open end of the housing.

3. A confection comprising a housing, a centrally disposed slotted stick therein, a wafer of less length and breadth than the interior of the housing supported in said slot with its edges out of contact with the housing and dividing the latter into compartments, frozen masses of edible material in the latter sealed to the faces of the wafer and serving to protect it against defrosting when the confection is removed from refrigeration.

4. A confection comprising a housing, an edible partition forming compartments therein of less height and width than the housing, said partition having spaced parallel ribs, a slotted stick supporting said partition by embracing it between said ribs and serving to hold it out of engagement with the walls of the housing and congealed masses of edible material in said housing compartments extending around the edges of the partition.

5. A confection comprising a housing, and provided with a passage in the bottom, a slotted stick extending therethrough having shoulders engaging said bottom, a wafer seated in said slot out of contact with the bottom of the housing and forming compartments in the housing, two kinds of confection material in the compartments, the masses of confection sealed to the faces of the wafer and united around its edges to protect the wafer against deterioration by defrosting when exposed to normal temperature.

6. A confection comprising a wafer-like edible partition, said partition having spaced parallel ribs, said partition carried by a slotted stick with said ribs interlocking with the bifurcations of the stick, two kinds of edible material stabilized by one of the groups consisting of gelatine, pectin and agar agar molded into form and adhered to the faces of the partition, a portion of said materials extending around the edges of the partition and protecting it against deterioration by defrosting.

7. A confection comprising a housing, an edible partition forming compartments therein and of less area than the interior of the housing, a centrally disposed slotted stick locating and supporting said partition in a vertical position away from the interior surfaces of said housing, congealed masses of edible material filled into said housing compartments, sealed to the faces and extending around the edges of the partition, the partition seated in the slot of the stick to prevent it and the masses sealed thereto from slipping downward on the stick while the confection is being eaten.

8. A confection comprising a housing having a passage in the bottom, a portion of a slotted stick extending therethrough, the slotted end of the stick engaging said bottom, a wafer seated in said slot supported in vertical position out of contact with the housing and substantially separating the housing into two compartments, two flavors of confection material frozen in the compartments, and sealed to the housing and the faces and edges of the wafer and stick, supporting the confection on the conjoined wafer and stick.

9. A confection comprising an edible housing, a centrally disposed wafer therein, said wafer substantially separating two kinds of confection, said confection frozen and adhered to the faces and edges of said wafer, the two confections sealed together at their edges providing a strong bond for binding the frozen masses to the wafer, said confection duly stabilized with one of the groups consisting of gelatin, pectin and agar agar to prevent the formation of icy crystals in the confection including the moisture in the wafer.

HARVEY C. GIBSON, Sr.

REFERENCES CITED

The following references are of record in the file of this patent:

UNITED STATES PATENTS

| Number | Name | Date |
|---|---|---|
| 1,524,367 | Papageorge | Jan. 27, 1925 |
| 1,867,945 | Hunter | July 19, 1932 |
| 1,882,290 | Meagher | Oct. 11, 1932 |
| 1,941,010 | Jones | Feb. 13, 1934 |
| 1,980,588 | Hopp | Nov. 13, 1934 |
| 2,004,863 | Gibson | June 11, 1935 |

OTHER REFERENCES

"Manufacture of Sherbets and Ices," W. P. Martin, The Ice Cream Trade Journal, September 1938, page 12.